Oct. 16, 1945.　　　E. H. ROONEY　　　2,387,091
DRAFTING TEXTILE FIBER
Filed Oct. 30, 1941　　　8 Sheets-Sheet 1
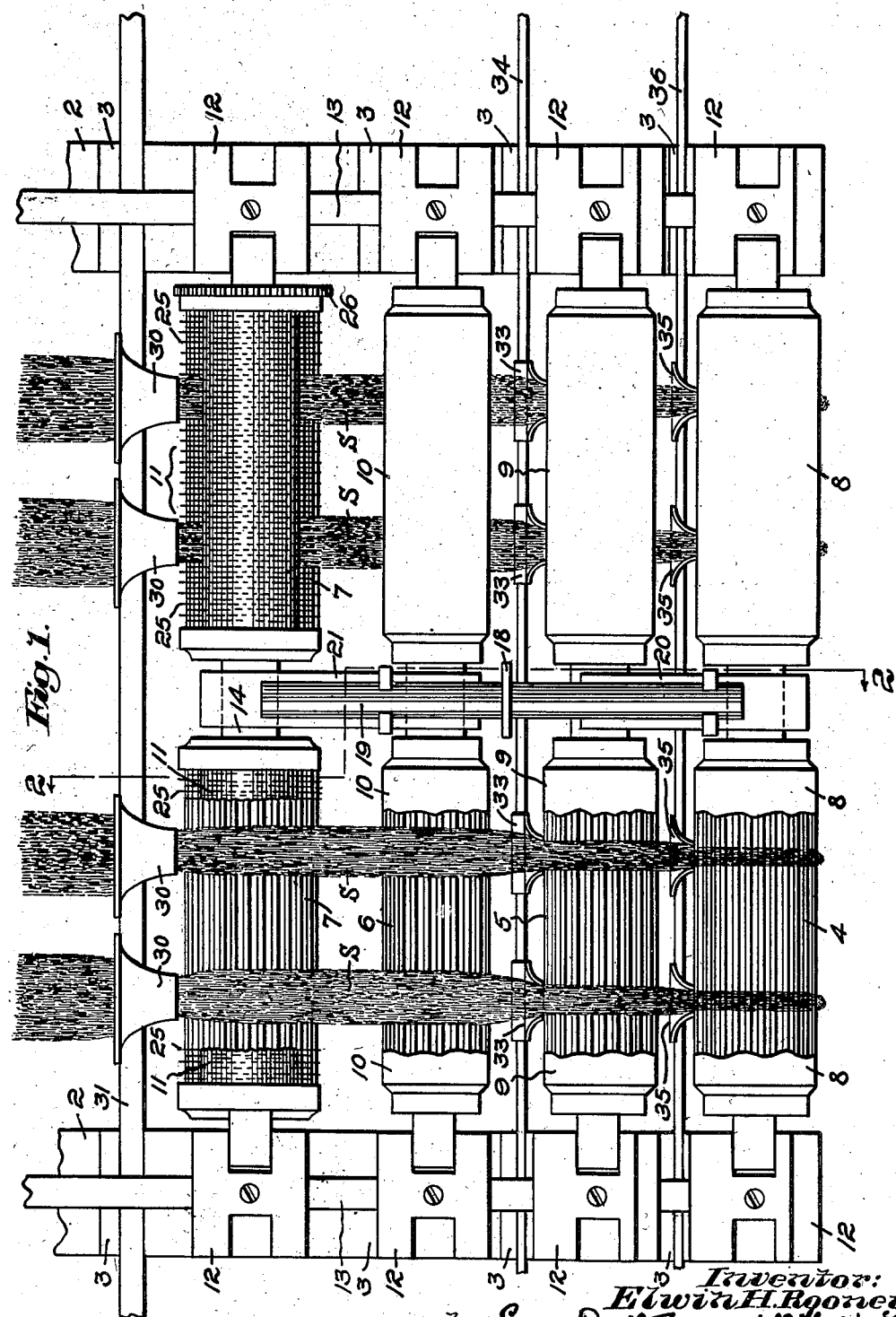
Inventor:
Elwin H. Rooney,
by Emery, Booth, Townsend, Miller & Weidner
Attys Oct. 16, 1945.  E. H. ROONEY  2,387,091
DRAFTING TEXTILE FIBER
Filed Oct. 30, 1941   8 Sheets-Sheet 2
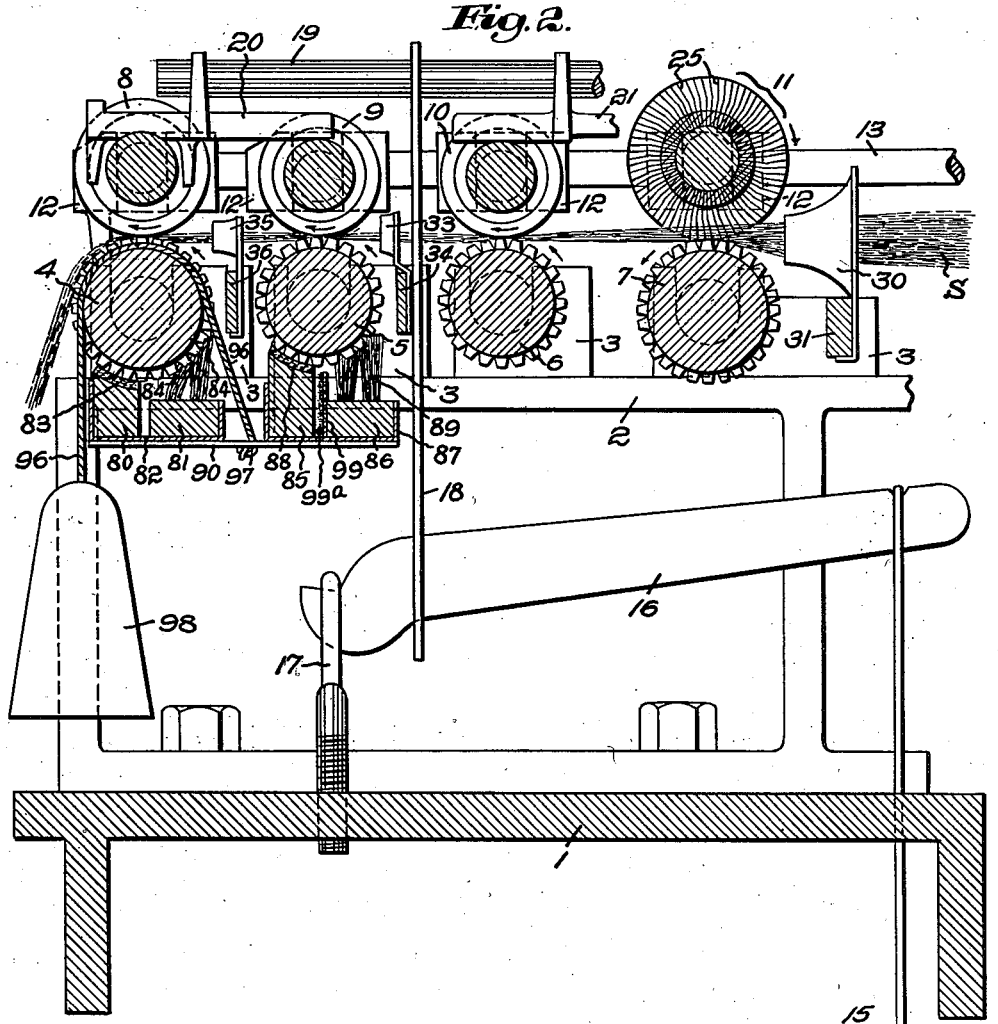
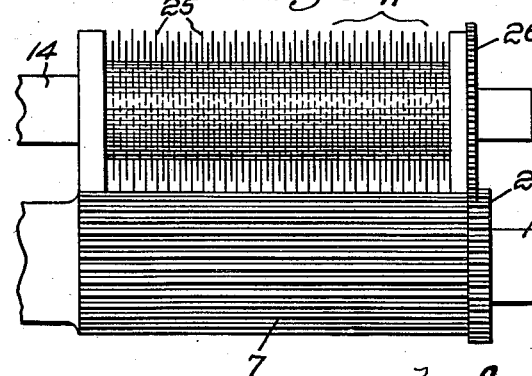
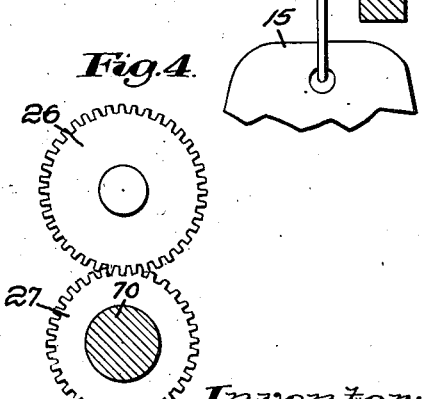
Inventor:
Edwin H. Rooney,

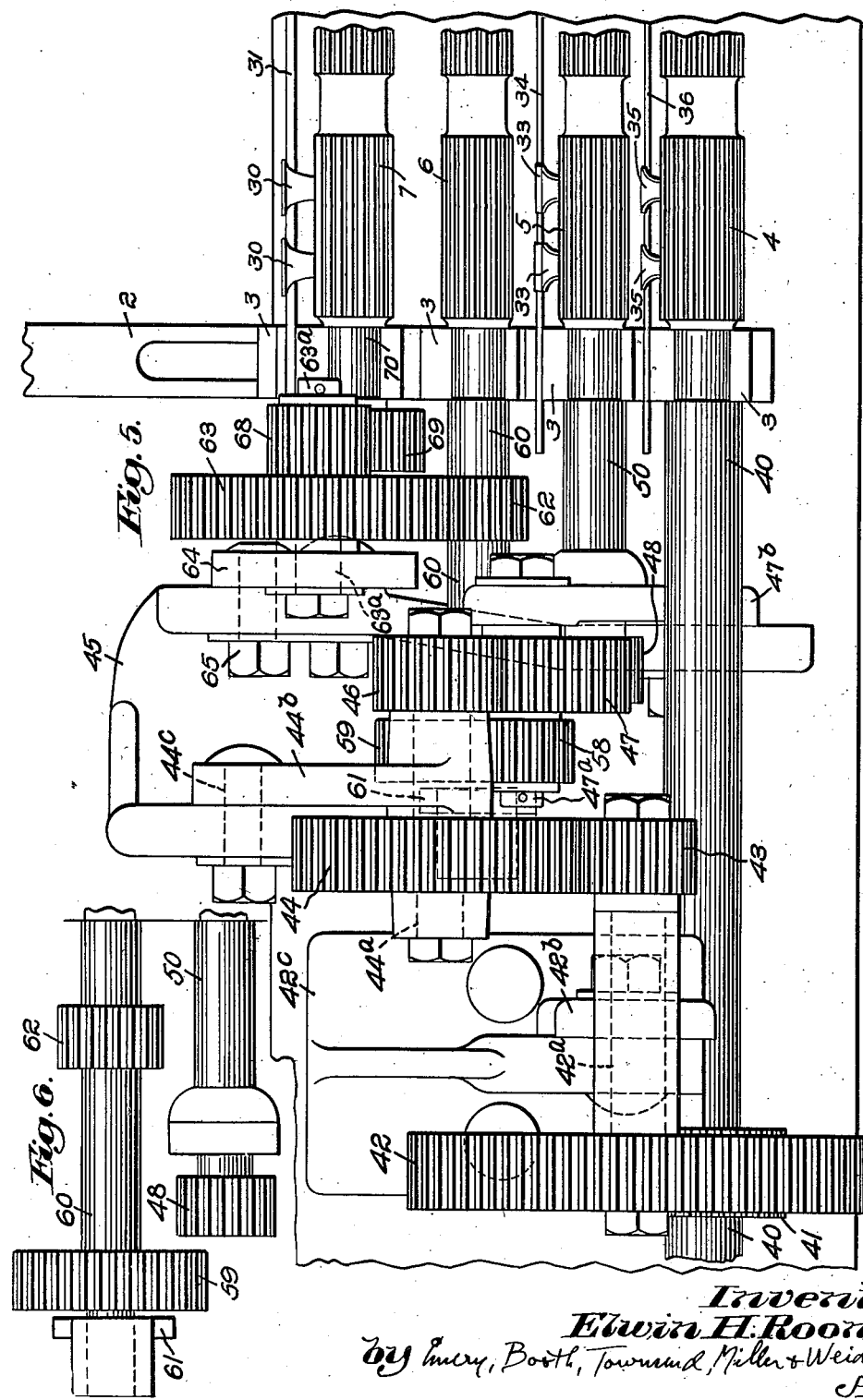

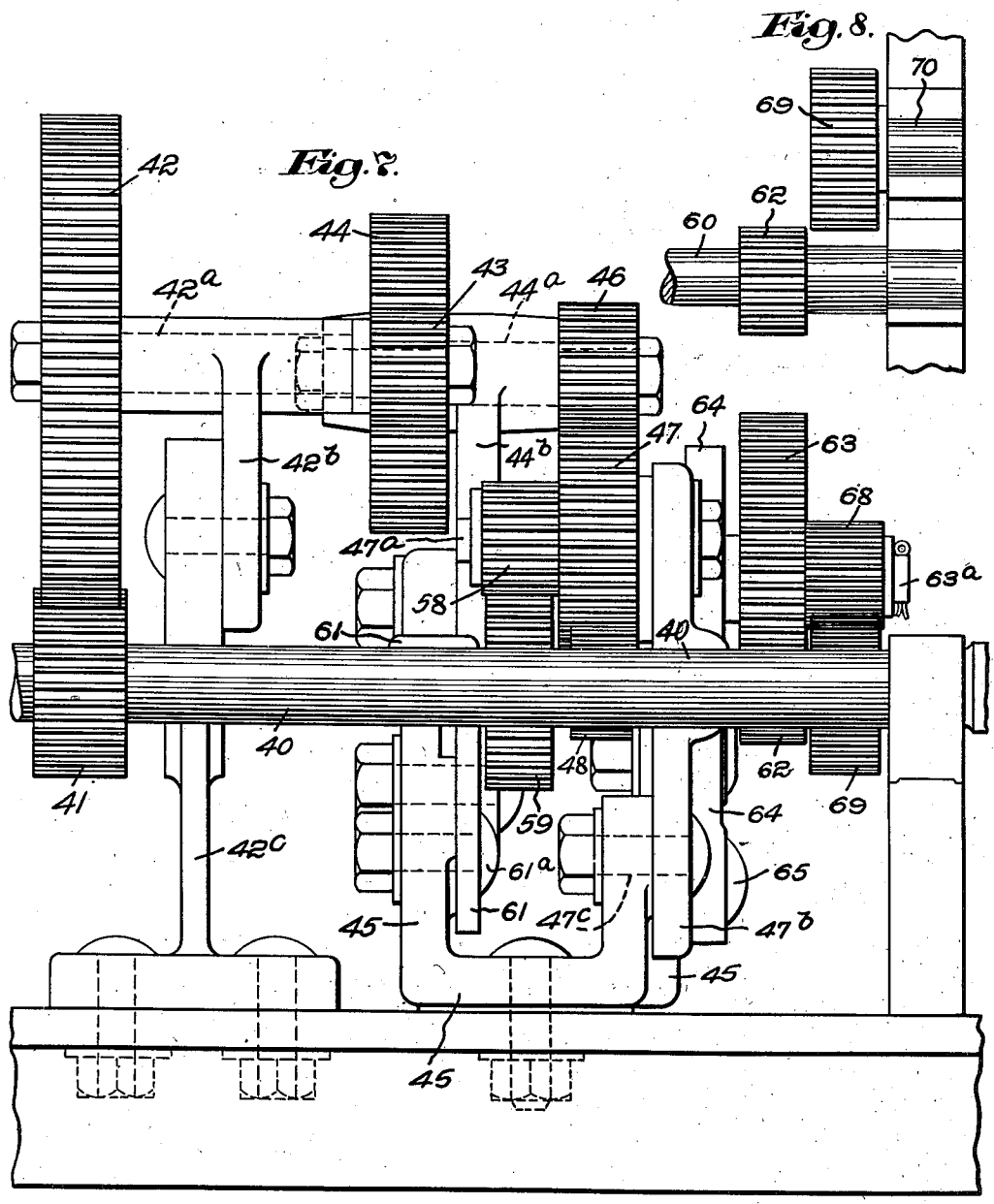

Oct. 16, 1945.   E. H. ROONEY   2,387,091
DRAFTING TEXTILE FIBER
Filed Oct. 30, 1941   8 Sheets-Sheet 5
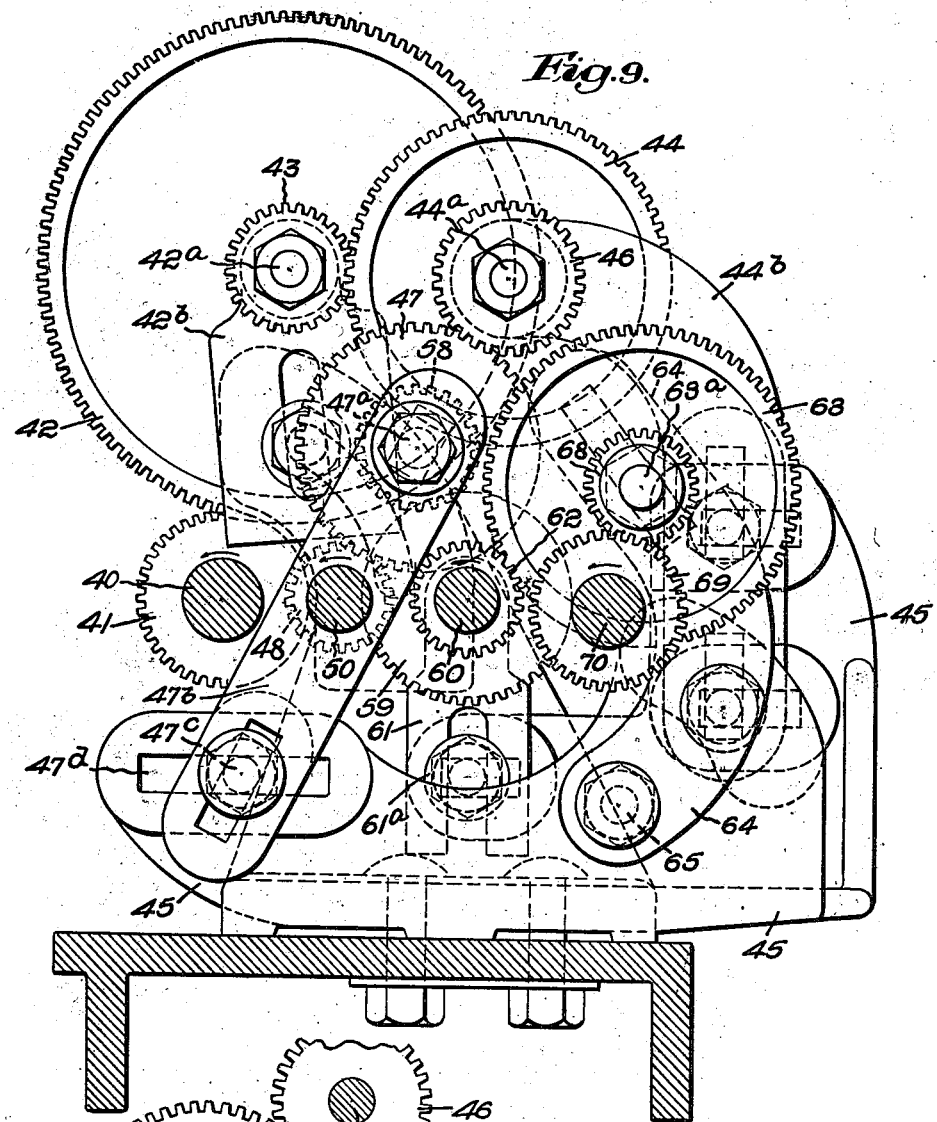
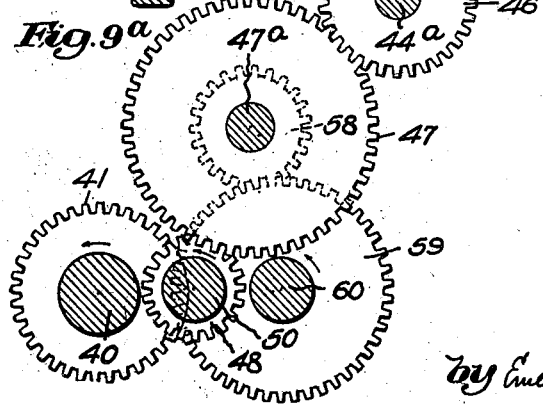
Inventor:
Elwin H. Rooney,
by Emery, Booth, Townsend, Miller & Weidner
Attys.

Oct. 16, 1945.   E. H. ROONEY   2,387,091
DRAFTING TEXTILE FIBER
Filed Oct. 30, 1941   8 Sheets-Sheet 6
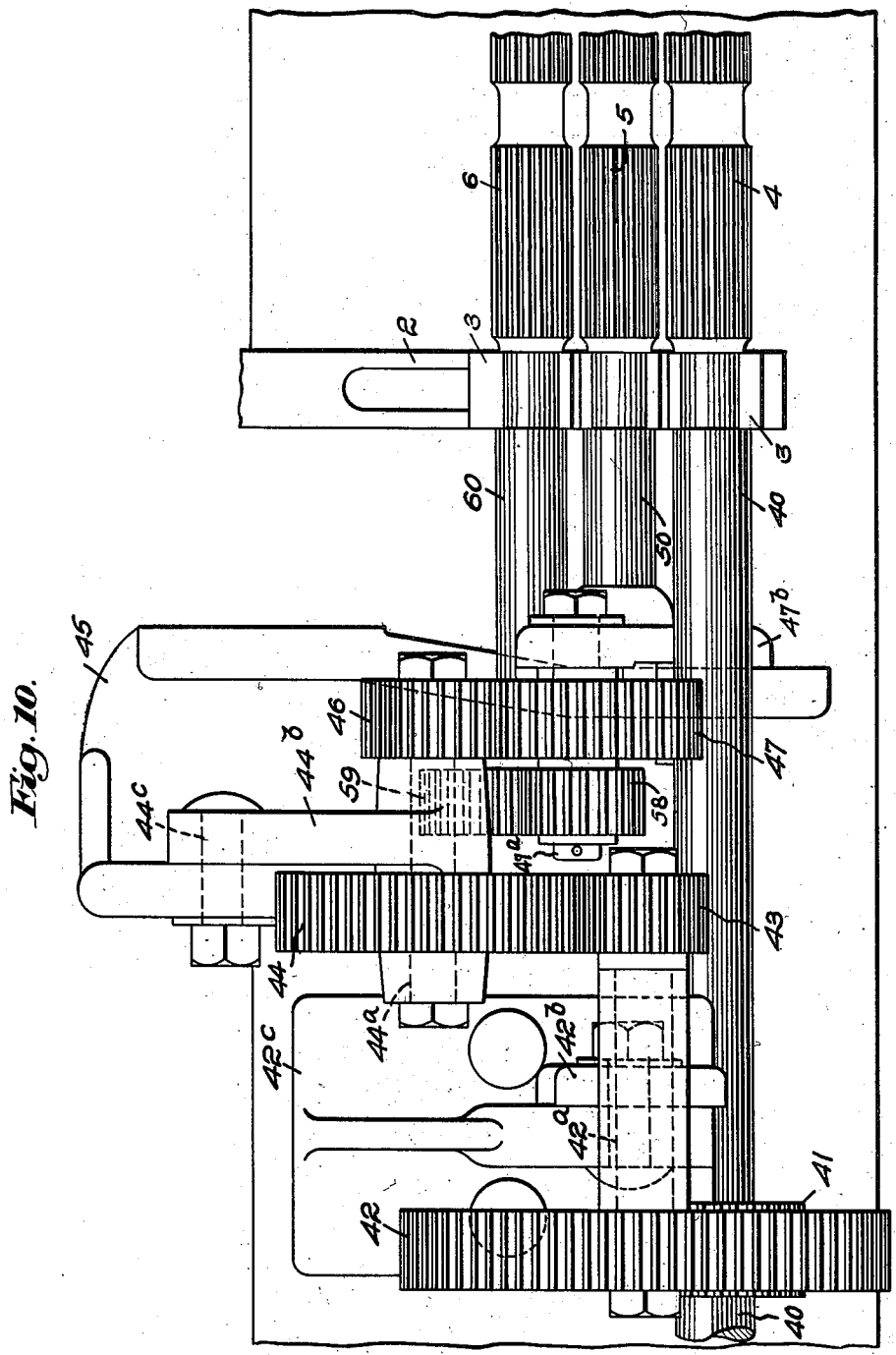

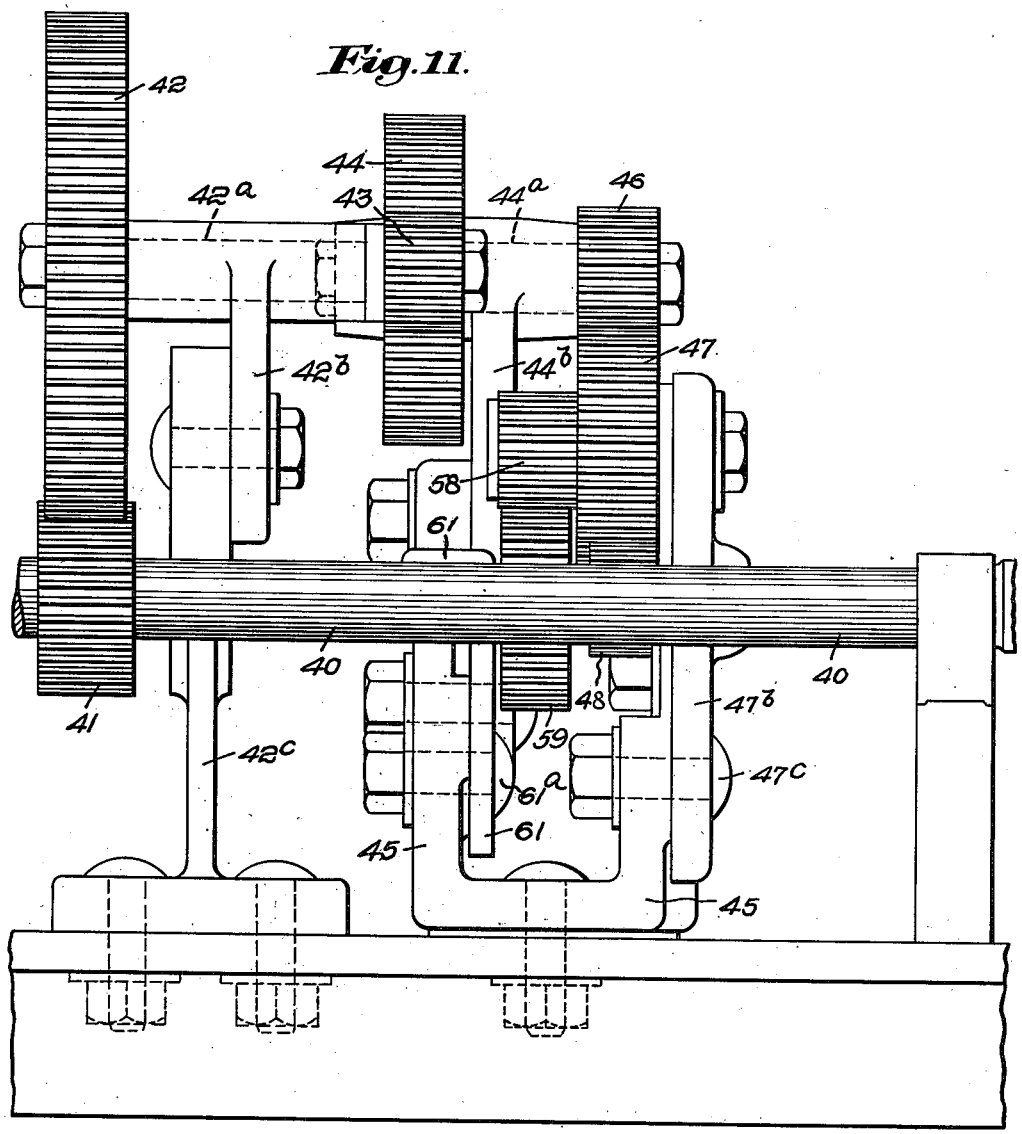

Oct. 16, 1945.   E. H. ROONEY   2,387,091
DRAFTING TEXTILE FIBER
Filed Oct. 30, 1941   8 Sheets-Sheet 8
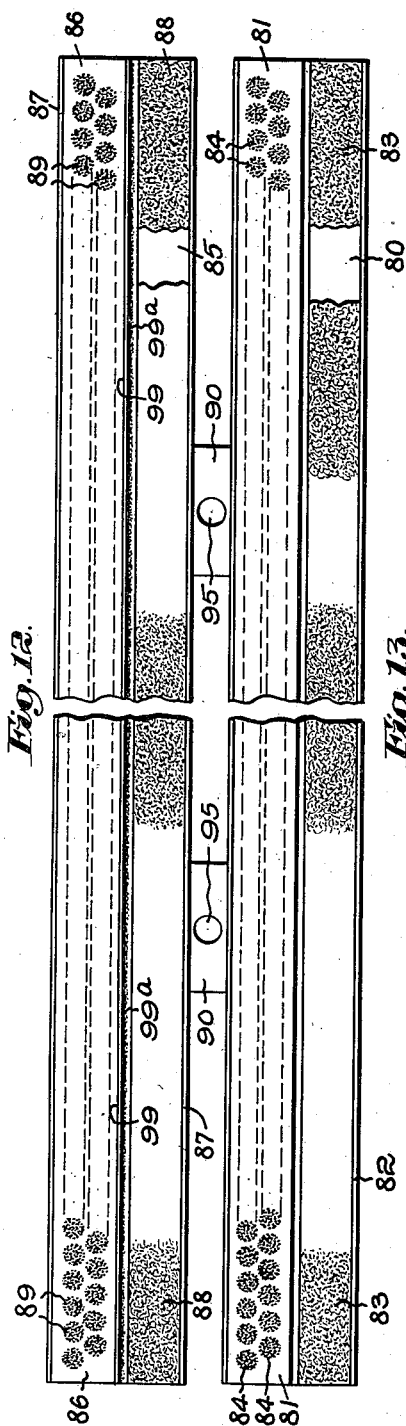
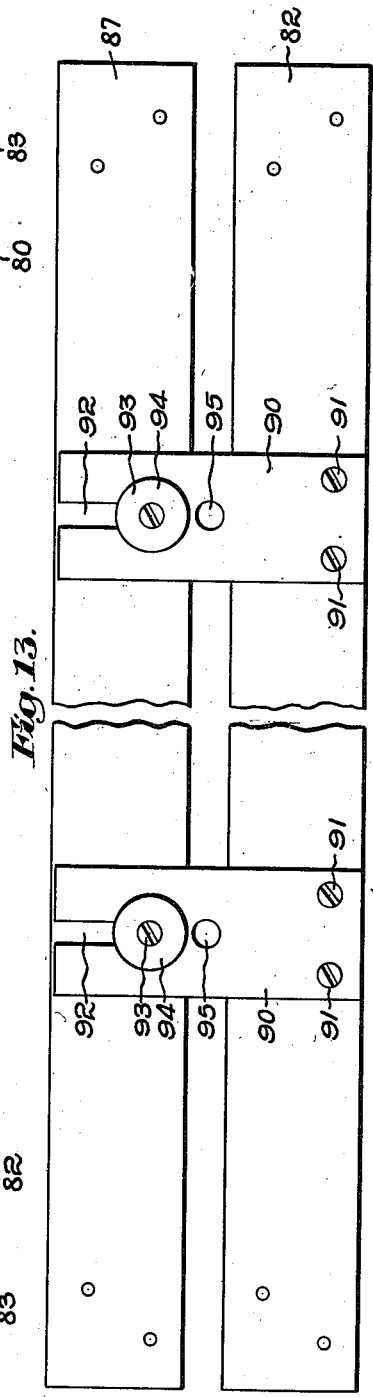
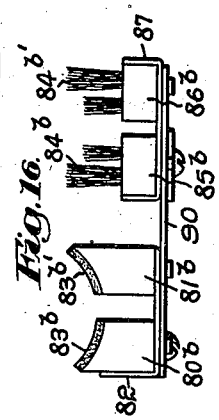
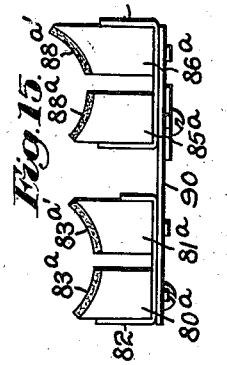
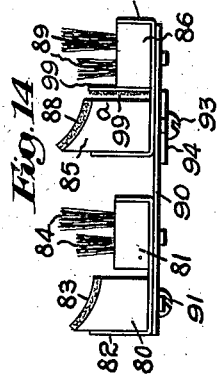
Inventor:
Elwin H. Rooney,
by Emery, Booth, Townsend, Miller & Weidner
Attys Patented Oct. 16, 1945

2,387,091

UNITED STATES PATENT OFFICE 2,387,091

DRAFTING TEXTILE FIBER

Elwin H. Rooney, Buttonwoods, R. I.

Application October 30, 1941, Serial No. 417,118

7 Claims. (Cl. 19—130)

My present invention relates to drafting fibers in roll-frames for textile purposes. It aims to provide improved methods and apparatus for obtaining a relatively high draft, as a single continuous operation in one frame, while at the same time maintaining or improving the quality of the product, as to strength, uniformity and other desired characteristics. The invention is primarily concerned with the novel provision and use of a plurality of roll pairs in excess of three in a given frame, but, as will appear from the following description in connection with the drawings, certain features and aspects of the invention are pertinent also to three-roll drafting apparatus, that is, frames having but three pairs of top and bottom rolls.

An important object of the present invention is a novel embodiment and process adaptation of the broad Rooney System, through the employment of multi-point or wire combing Rooney rolls such as disclosed and claimed broadly in United States Letters Patent No. 1,933,222 to Thomas P. Rooney, dated October 31, 1933. In accomplishing this object, the present invention offers a practical and proven solution of the present-day problem involved in efforts to get away from what for the past decade or so has been normal or conventional card-room and mill practice, namely, the use of multiple stages, drawing passages or changes from one frame to another in progressing from the relatively coarse unspun fibrous material, for example as ordinarily supplied to a slubbing frame, through the various finenesses of roving customarily obtained at the several intermediate and fine or jack frames, to the spun thread or yarn product of the spinning frame. By contrast with such former practice, my present invention accomplishes, in one Rooney-System frame, or drawing passage, and with equal or improved quality of product, what under conventional practice would have required the use of two, three or even four separate and successive frames or drawing passages. In accomplishing these results the invention is particularly characterized either by obtaining through the medium of a given number of rolls including a Rooney roll a total draft at least equal to the previous normal or conventional for such number of rolls while importantly improving the quality of the roving, thread or yarn, or by obtaining with a given or a reduced number of rolls including a Rooney roll a substantially greater total draft than customary with such given number and at the same time at least maintaining the usual standard quality for the roving, thread or yarn product, while at all times affording a graded or controlled draft of the desired extent.

In the drawings illustrating apparatus embodying the invention and by means of which its methods may be practiced:

Fig. 1 is a top plan view of one group of rolls in a converting frame typifying the invention as embodied in a four-roll installation;

Fig. 2 is a vertical cross section through the apparatus of Fig. 1, as on the line 2—2 of the latter;

Figs. 3 and 4 are respectively a front elevation and an end view of a roll pair such as seen in the back or No. 4 position in Figs. 1 and 2;

Fig. 5 is a top plan, on a reduced scale, of an end portion of a frame such as that of Fig. 1, showing the drive gearing, the top rolls of each of the four pairs being omitted;

Fig. 6 corresponds to a portion of Fig. 5, with parts removed for clearness, showing certain gearing for the first intermediate or No. 2 roll shaft and the second intermediate or No. 3 roll shaft;

Fig. 7 is a front elevation of the drive gearing of Fig. 5;

Fig. 8 shows a detail of the gearing, in top plan;

Fig. 9 is a vertical section at that end of the frame seen in Fig. 5, illustrating the drive gearing in elevation, as viewed from the right in Fig. 5, Fig. 9a being a portion of said gearing;

Fig. 10 is a top plan corresponding to a portion of Fig. 5 with the frame of said figure adjusted for three-roll high-drafting;

Fig. 11 is a front elevation of the drive gearing of Fig. 10; and

Figs. 12 to 16 illustrate certain novel roll clearer means such as appears in cross section in Fig. 2, Figs. 12 and 13 being top and bottom plans respectively and Figs. 14 to 16 being end views, on a reduced scale, and in which Figs. 15 and 16 are modifications.

Referring now more particularly to Figs. 1 to 4, I have there shown a four-roll apparatus (i. e. four roll pairs) illustrative of the invention. This apparatus, a portion of the main support or platform of which is seen at 1 in Fig. 2, will herein be termed a converting frame or simply a roll or drafting frame, as this single frame embodying the Rooney System generally will take the place of two or more of the separate roll frames necessary under the prior mill practice, such as slubbers, intermediate, roving, jack or fine frames and even spinning frames, and hence no one of those terms is entirely appropriate.

As best seen in Fig. 2 the roll devices are mounted on a stand 2 carrying brackets 3 for a series of lower rolls comprising a lower front roll 4, two lower intermediate rolls 5 and 6, and a lower rear or break draft roll 7. These lower rolls may be of any preferred form, such as the longitudinal fluted steel type shown.

In overlying paired relation with the respective lower rolls are the corresponding upper rolls, including the front top roll 8, first and second intermediate rolls 9 and 10 and in the top rear position a special multipointed Rooney comber-drafting roll indicated as a whole by the numeral 11. These top rolls are rotatably supported in bearings 12, 12, etc. adjustable on a cap bar 13, one adjacent each end of the roll units, the latter herein illustrated as having two cylindrical drafting elements or roll sections lengthwise the core or spindle of each unit, see Fig. 1, and between them the usual intermediate cylindrical boss 14 to receive the saddle of the weighting device.

While any suitable weighting means for the top rolls may be employed, I prefer and have shown a compound device whereby the desired weighting effect is applied to each of the four top rolls by a single weight such as represented at 15 in Fig. 2. This weight is suspended at the rear of a lever 16 fulcrumed at its front end in an adjustable eye or the like 17 on a fixed part below the rolls. A vertical wire or rod 18 is connected at its lower end to a front portion of the lever 16 and has its upper end hung substantially centrally on a saddle bar 19 overlying the central bosses 14 of the several roll units. On this saddle bar there is also hung a pair of double yoke members 20, 21 having downwardly open bearing formations adapting them to seat on the roll bosses. The forward yoke 20 thus engages and weights the front top roll 8 and the first intermediate roll 9, while the other yoke 21 similarly seats on the second intermediate roll 10 and on the rear Rooney roll 11.

The front top roll 8 and the two intermediate top rolls 9 and 10 may be of any usual or preferred construction, such as the leather or other covered type in common use. In the top rear or break-draft position, in accordance with the invention, I employ a form of Rooney roll of the type originally disclosed in United States Patent No. 1,933,222 previously mentioned and other constructions for which are presented in Patent No. 2,023,032 and in my copending application Serial No. 410,840. Such rolls comprise essentially a large multiplicity of relatively fine points 25 adapted to engage the fibrous stock with a marked combing and paralleling action attendant on its drafting passage beneath it.

For the purposes of my present invention it is desirable that this multi-pointed roll 11 be positively driven, at a determined speed and at definite speed ratio with respect to its cooperating under roll 7. Accordingly, as best seen in Figs. 3 and 4, also in Fig. 1, this top rear unit 11 has near one end of its spindle a toothed gear 26 meshing with a gear 27 fixed on the spindle of said lower roll 7. The particular ratio selected for these gears 26, 27 depends on the given drafting operation, character of the fibrous material to be drafted, and other attendant factors. While in some instances a direct or 1 to 1 ratio may be appropriate, generally the multi-pointed top roll such as 11 is given a differential movement relative to its lower roll, said top roll usually being driven somewhat more slowly. Thus in the illustrated example the upper multi-pointed gear 26 and the lower gear 27 have 40 and 36 teeth respectively, giving a 10 to 9 ratio as between the lower and driving roll 7 and the driven multi-pointed roll 11.

The sliver or fibrous stock S, Figs. 1 and 2, is conducted to the rear rolls 7, 11 through trumpets or condenser guides 30. These guide devices may be of any usual or preferred form and may be mounted as customary on a traverse bar 31 slidably supported as in guide slots in the rear roll bracket 3, Fig. 2. Generally, and as herein shown, provision also is made for guiding and confining the fibrous strand in its passage between the intermediate roll pairs 5, 9 and 6, 10 and preferably also, in the four-roll system illustrated, between the front roll pair 4, 8 and the adjacent intermediate roll pair 5, 9.

One form of condensing guide which I have found well adapted for use at either or both of the points mentioned is the open top type, for example as in United States Patent No. 2,079,122, dated May 4, 1937. In the present case I have illustrated in Figs. 1 and 2 open top trumpet-like condenser guides 33 between the intermediate roll pairs on a traverse bar 34 mounted in the bracket 3 for the lower roll 5. Similarly, between the front and the intermediate roll pairs I have here shown open top guides 35 on a traverse bar 36 slidable in the bracket 3 for the lower front rolls 4. However, in the practice of the invention satisfactory drafting results are obtainable in the absence of special condensing guide means between adjacent roll pairs.

Thus it will be noted that in the practice of my invention I am able to dispense with longitudinally driven or infolding guide means for the fibrous stock or ribbon between successive rolls; indeed in many instances even such inter-roll guides as above described may be omitted at one or more such locations. As seen in Fig. 1 the fibrous band or ribbon becomes narrower in the course of its drafting passage through the several rolls, mainly as the attendant result of the drafting action itself, in accordance with the invention, and without special infolding of the ribbon edges, compacting of the fibers or holding action upon them by the guide devices, which latter serve merely in the manner of the trumpet or cone guides customarily employed behind the break-draft rolls.

The rolls of the front and the two intermediate roll pairs, as above indicated, may be standard both as to the lower and the upper members. The same also applies as to their diameter, and in general to their spacing in the direction of the travel of the material, except that such spacing, if modified, is reduced rather than extended, with reference to that customary between the front rolls and the single pair of intermediate rolls of the conventional three-roll drafting systems. This is particularly the case as to the setting between the front rolls 4, 8 and the first intermediate rolls 5, 9 which desirably does not exceed about 1⅜ to 1⅝ in. Between my first intermediate rolls 5, 9 and the additional pair of intermediate rolls 6, 10, the latter of course not found in the conventional three-roll system, the setting while desirably still fairly close may be somewhat greater than between the front rolls and the first intermediate pair, for example, about 1½ to 1¾ inches to accommodate the connections for the weighting means.

In the break draft position, as already indicated, the lower roll 7 may be of standard type. It also may be of ordinary diameter but preferably somewhat greater than that of the intermediate rolls, being here shown as of approximately the same size as the lower front roll 4. And as already described, this lower rear roll 7 is provided with the special gear 27 for positively driving the multi-pointed upper rear roll 11. The latter has an external diameter preferably somewhat greater than customary in drawing frames, and usually, as in the instance illustrated, is of about 1⅛ to 1⅜ inches or thereabouts in diameter. The spacing between this break draft roll pair 7, 11 and the following intermediate pair 6, 10 also desirably is kept rather short, but may be say 1½ to 2 inches, about the same as or somewhat greater than that between the intermediate roll pairs. It will be understood that the distances mentioned are between roll centers.

But as to the speeds of the several roll pairs, their driving connections and the predetermined controlled length of draft at the several inter-roll positions, my invention represents a wide departure from or substantial reversal of conventional drafting practice of the last decade or so. Under the conventional three-roll system efforts toward obtaining an increased total draft have necessarily been directed to lengthening the draft at the front rolls, that is, in the position or passage between the front rolls and the single pair of intermediate rolls. This is because at the break draft position, that is, between the rear or break draft rolls and the single pair of intermediate rolls, little or no draft can be applied with the customary roll equipment. Any greater draft there is inconsistent, in the conventional system, with obtaining the essential breaking and fiber-aligning action at the rear rolls.

In such conventional systems the draft at the rear or break draft rolls averages the almost negligible amount or ratio of from about 1.06 to 1.08, and to about the best of my knowledge has never been over 1.125 in actual practice. Hence in order to obtain a reasonable total draft on the conventional intermediate and jack frames, seldom exceeding about 7 on any one frame, practically all of the draft has had to be provided at the front-roll position. For example, with the average conventional break draft of 1.06 a front roll draft of 6.50 is needed to give a total draft of but 7.09. Assuming an absolute maximum conventional break draft of 1.125 a total draft of but 7.31 is had even with said relatively large 6.50 front roll draft. Any higher total draft could be had only by further enlarging the draft at the front rolls, between them and the single intermediate pair, to figures above 6.50. Various attempts along that line have been made on three-roll frames but with more or less unsatisfactory results, particularly as to the quality of the product, and the practicable limit of extended front-roll draft appears to have been reached.

In contrast to the foregoing efforts toward high drafting by the use of higher drafts at the front rolls, I now propose to turn in the opposite direction and to reduce the draft or maintain a relatively low draft at all inter-roll positions forwardly of the break draft position, while at the same time obtaining an equal or increased total draft and a maintained or improved quality of product. This I accomplish in a manner heretofore not feasible, namely, by increasing the break draft.

Thus my present invention involves first the recognition of the advantages of increasing the break draft and attendantly thereon providing a system and apparatus whereby that may successfully be done. That system and apparatus as here disclosed involve essentially an upper rear multi-pointed roll having a high break-drafting and combing action, together with various associated features of construction and arrangement.

To give one specific example of the operation of my four-roll system such as that of Figs. 1 and 2, the roll frame there shown may be regarded as in effect a conversion of a conventional jack-frame into a one-process slubber producing say a 20-hank roving from a 44-grain sliver, which involves a total draft of 103.50. Under my present system that total result may be had all in one and the same roll frame, yet with the use of an intermediate draft of only 4.50 and a final draft of but 4.60 in the selected example.

This exceedingly high single-frame total draft is attained by an increase of the break-draft, at the multi-pointed roll station, to a figure of 5.00 in the cited instance, as contrasted with the highest conventional break draft of 1.125. Such quadrupling of the break-draft, although followed by the low intermediate and final drafts of 4.50 and 4.60 (substantially under the conventional 6.50 draft needed for the total 7.09 draft of the previous example) yields the desired total draft of 103.50 (5.00×4.50×4.60=103.50).

Thus my present invention affords by a one-step process, that is, in a single roll frame, what has heretofore conventionally required a four-stage operation. For a comparable result such conventional practice would use the following separate frames and typical drafts: first a slubber having a draft of 4.00 making from the same 44-grain one-strand sliver a .76-hank slubber roving. This slubber roving was transferred to a first intermediate frame, doubled and drafted 5.00 to give a 1.90-hank intermediate roving. The latter in turn went to a second intermediate frame, where it was doubled and drafted 6.00, affording a 5.71-hank second intermediate roving. This again was taken to a jack frame, doubling and drafting 7.00 finally to give the comparable 20-hank roving of the cited example under my present one-step system.

In the foregoing representative figures from the prior practice I have assumed the maximum theoretical conventional break draft of 1.125 at each of the successive roll frames. But since four separate operations, on four individual roll frames were employed, with corresponding large labor, power and time factors, the final draft at the front rolls of each frame could be kept low enough to be consistent with good quality of product. Thus with the cited conventional drafts of 4.00, 5.00, 6.00 and 7.00 at the four frames, each with a maximum break draft of 1.125, the final or front roll drafts respectively were 3.55, 4.44, 5.33 and 6.22. These figures are here mentioned in order to emphasize that while under my present system I obtain in my single-frame converting apparatus such large total drafts as the 103.50 of the above typical example, yet the two drafts (4.50 and 4.60 in the example) following my novelly increased break-draft (5.00 in the typical example), are well within the range of the conventional front-roll or final draft, which latter seldom exceeded about 6.50. By thus avoiding any single draft in excess of 6.50, after my break-draft, contrary to other modern attempts at high drafting and at consolidation of drafting stages, I am able to maintain or substantially to improve the quality of the resulting product with reference to that heretofore had under the conventional four-stage system such as described, in addition to the time, power and labor-saving advantages of my one-step process over the said four-frame system.

The lower rolls 4, 5, 6 and 7 of the four pairs are driven at the predetermined speeds and ratios to afford the high break-draft and the intermediate and final drafts of not over 6.50, as in the above typical example. The driving mechanism for this purpose is compactly disposed at one end of the frame, desirably the head end, that is, the end at which is located the usual main drive gearing (not shown) between the power shaft an the front roll shaft. This drive mechanism comprises a gearing assembly compacted into the limited space available at the end of the roll shafting and including change-speed devices or change gearing whereby the three drafts may be controlled and graded or adjusted, within the described ranges, as appropriate to the particular drafting job. Moreover this roll drive gearing is so constructed and arranged that it may readily be converted from the four-roll system as represented in Figs. 1 to 9 to the close-set three-roll system of Figs. 10 and 11, and vice versa.

Referring now to said Figs. 5 to 11, and particularly Figs. 5, 7 and 9, the four lower rolls 4, 5, 6 and 7 are seen at the right in Fig. 5, the upper rolls and their supporting cap bar having been removed to simplify the view. In describing and numbering these rolls I have generally referred to them in the order from front to rear, accordingly terming them the front roll, first intermediate, second intermediate, and rear or break-draft rolls. They may also be referred to in the same order as the No. 1, No. 2, No. 3 and the No. 4 rolls. Their respective shafts or end extensions thereof are seen in plan in Fig. 5 and in section in Fig. 9, being correspondingly numbered 40, 50, 60, and 70, again from front to back.

Power is received by the front roll shaft 40, through the usual transmission gearing at the head end of the frame and not necessary to show here. On this shaft 40 is fixed a drive gear 41, seen at the left in Fig. 5, it being in this instance the outermost element of my roll-gearing assembly and farthest spaced from the rolls themselves. This drive gear 41 meshes with the large crown gear 42 on a short shaft 42a journaled in a bracket 42b having a base 42c detachably or otherwise secured to the main frame as by bolts or the like; see also Fig. 7.

On the same shaft 42a with the crown gear 42 is a demountable change gear or pinion 43, this being the first of a series of three shiftable elements provided in my gearing assembly whereby the predetermined setting of draft may be had for the several locations or inter-roll passages. This first change-gear 43 meshes with an intermediate gear 44 on a short shaft 44a mounted in a bracket 44b adjustably connected as by bolting at 44c to a base or bracket support 45. The latter, which includes a U-shaped lower portion, as best seen in Fig. 7, is bolted or otherwise attached to the main framing.

On the same short shaft 44a with the intermediate gear 44 is a smaller gear or pinion 46 having driving engagement with a further intermediate gear 47 on another short shaft 47a carried at the upper end of a supporting arm or bracket 47b slotted at its lower end for universally adjustable connection as by a bolt 47c received in an upright slotted flange 47d on the bracket base 45 above mentioned.

Said intermediate gear 47 has driving engagement directly with the roll gear 48 fast on the shaft 50 of the first-intermediate roll 5.

On the same short shaft 47a with the intermediate gear 47 there is also demountably positioned a second change gear 58 adapted to mesh with a gear 59 fast on the roll shaft 60 of the second-intermediate roll 6. This shaft 60 and the gearing thereon are supported on an upright arm 61 secured as by bolt and universal slot connection 61a to the bracket support 45. Thus the second-intermediate roll shaft 60 is driven from an intermediary element of the gear train which connects the front roll shaft 40 and the first-intermediate roll shaft 50.

To carry the drive on back to the rear roll I provide on the second-intermediate roll shaft 60 a gear or pinion 62 meshing with a larger intermediate gear 63 on a short supporting shaft 63a in a bracket 64 detachably secured as at 65 to the bracket base or support 45 already referred to.

This last-mentioned short shaft 63a also serves to carry a third change-gear 68 for independently controlling the initial or break-draft, at the back roll pair 7, 11. This change-gear 68 in turn meshes with the back roll gear 69 fast on the back roll shaft 70.

From the above it will be seen that herein the drive for the first-intermediate roll 5 and its shaft 50 is obtained from the driven front-roll shaft 40 through the described variable gear train 41, 42, 43, 44, 46 and 47 driving the first-intermediate roll gear 48 on said shaft 50. Similarly the drive for the second-intermediate roll 6 and its shaft 60 is had from the front roll shaft 40 through a portion of the gear train just mentioned, up to the intermediate gear 47 on the stud shaft 47a. From that point the drive is by means of the second change gear 58 on said stud shaft 47a directly to the second intermediate roll gear 59 on the roll shaft 60 of said second intermediate roll 6. The back roll drive is had from the second-intermediate shaft 60 through the gearing 62, 63 and the third change-gear 68 onto the gear 69 fast on the shaft 70 of the back roll 7.

From the foregoing it will be noted that the first change-gear 43 provides for the adjustable control of the draft at the front roll station, that is, it affords a selective gear ratio as between the first-intermediate roll pair 5, 9 and the front roll pair 4, 8. Since also this first change-gear 43 is included in the complete train of gearing between the front roll and the second-intermediate roll, while the drive for the rear roll in turn is taken from the second-intermediate roll shaft 60, shifting of the first change-gear 43 also effects a proportionate shift in the ratios for the second intermediate and the back roll shafts. However, through the medium of the second change-gear 58 the speed and draft at the second-intermediate roll and also that at the back roll can be controlled and graded independently of that at the front roll position. Still further, the break-draft, in the position between the back roll pair 7, 11 and the second intermediate roll pair 6, 10 can be adjustably controlled independently of all the other rolls and drafts, by reason of its own separate change-gear 68.

Further in accordance with my present invention the described gearing assembly for the four-roll system of Figs. 5 to 9 is so constructed and arranged that whenever for any reason the high drafting and attendant advantages of that system are not required for some particular job, the same roll frame may be readily converted into a three-roll system and particularly into such system wherein an extremely close-setting for the three-roll pairs is obtainable, as illustrated for example in Figs 10 and 11.

To accomplish such conversion it is herein necessary merely to remove the back roll pair, lifting the rear top multi-pointed roll 11 from its bearings in the cap bar and then demounting the lower rolls 7 with their shaft 70 and its gearing connections to the second-intermediate shaft 60. For this purpose the entire bracket 64 carrying the intermediate gear 63 and the rear change-gear 68 is bodily demountable from the bracket-supporting base 45, at the bolting connection 65. All other elements of the roll drive assembly remain in place on the frame and available for a three-roll arrangement such as illustrated in Figs. 10 and 11, subject to appropriate positioning adjustment. Where an extremely close setting for the three-roll pairs is desired, such as shown in Fig. 10, this is readily had by correspondingly adjusting the relative positions of the No. 2 and No. 3 roll shafts and their gearing connections through the medium of the several adjustable bearing arms or brackets relative to their supporting bases 42b and 45.

In a close roll setting such as that of Fig. 10 inter-roll guides generally are unnecessary, and in any instances where such guides have been employed in the four-roll system of Figs. 5 to 9, they may be removed, in converting to a three-roll arrangement, by lifting out their respective traverse bars. As above noted, such trumpet or other guides, while herein shown at the intermediate and the final draft positions of Figs. 1 to 9 are regarded as largely unnecessary unless possibly where for some reason an exceptionally large spacing at those positions is used. It will also be understood that the converted three-roll arrangement of Figs. 10 and 11 is adapted for any preferred form of upper roll. For quality products and efficient operation a multi-pointed roll such as 11 is preferable at least in the upper rear position; that is, the back roll pair of the three-roll arrangement of Figs. 10 and 11 would comprise the former second-intermediate (now rear) roll 6 and an overlying multi-pointed roll 11. However, in connection with lower grades of yarn and in cases where quality of product, with or without high drafting, is not an important consideration, leather-covered or other standard rolls may be used throughout.

In the foregoing description the particular lengths given for the initial or break, the intermediate and the final drafts (5.00×4.50×4.60) are but typical. An important principle of the invention is an actual reduction or at least no substantial increase in both my intermediate and my final draft positions, as compared with the conventional front roll or final draft; i. e. my intermediate and final drafts in the four-roll system preferably do not exceed about 6.50. But in conjunction with those relatively low drafts, the break-draft is materially stepped up. In conventional systems the latter averaged 1.06 to 1.08, rarely if ever exceeding 1.125; the rest of the conventional total 6.00 to 7.00 of draft, say on a jack frame, came at the front roll position (e. g. 1.08 break-draft×6.48 front draft=7.00 total draft).

With this in mind, the improved high-drafting possibilities under my system will be evident. A relatively small actual length increase of but say 1.125 of break-draft is nevertheless a very high percentage increase, in fact 100% above the maximum conventional. Thus, if in the conventional example just mentioned (1.08×6.48=7.00 draft) the break-draft could be so increased to but 2.25, the total draft is double and becomes 14.58. Now under my system the break-draft is readily raised to the range of 4.00 to 8.00 on the average, and may run as high as 12.00 or even more. And this markedly increased break-draft in combination with two following stages or positions of draft in the one frame, while still keeping such intermediate and final drafts at not over about 6.50, affords a total single-process draft of a greatly extended range. Thus, as a rather extreme example, I may employ intermediate and final drafts of but 3.00 each after a high break-draft of say 12.00 and obtain in the single-frame operation a resulting total draft of 108.00 (12.×3.×3.=108.).

By way of further example, assume that in a given instance a total draft from sliver to roving of approximately 35 is desired. That may be had in my four-roll one-process frame with a break-draft of 5.14, an extremely low intermediate draft of but 2.00 and a final draft of 3.33, giving the desired total result of 34.23

(5.14×2.00×3.33=34.23)

In the course of my experiments I have found that for certain purposes, as in the case of yarns and threads for tire fabrics, where strength and regularity are all-important considerations, the provision of such an appreciable but low intermediate draft, which I have determined should be at least 2 but not over 3, contributes materially, through a maximum paralleling of the fibers, to the desired strength and quality of product.

In general the invention provides in the one-frame process whatever total draft is desired for the particular job while at the same time maintaining the strength and quality of the product at or above that under the standard conventional systems. These characteristics of strength and quality are in large part because the draft at the stage or stages after the initial or break-draft stage can be and generally is no greater than what is conventional for the corresponding roll position. As explained, the total draft under my system may be as great as 100 or more in one frame, as contrasted with a maximum in one frame of about 6 or rarely up to about 7 for extremely long-fiber materials, under conventional card room practice.

My disclosed process and apparatus are adapted not only for the drafting of sliver into roving, but also for converting a given roving to a finer roving and indeed in connection with the production of spun yarns from drawn rovings upon a spinning frame. The apparatus of Figs. 1 to 9 may be regarded as representative of that for any of such operations.

In such four-roll arrangement as applied to the card room, that is, for converting sliver to roving, the break-draft at the comber-drafting roll may be selected as between a minimum of about 2 up to as high as 7 to 8 or more. With this increased break-draft and simultaneous combing and fiber-paralleling effect, conventional or lower drafts of say 2 to 6 at the two following stages on the one frame give the desired result as to total draft, strength and quality. Another typical instance of draft settings for such operation is a break-draft of 3.5 followed by drafts of 5 and 5 at the other two stages, giving a total draft of 87.5. Where a less total draft is required, those at the stages after the break-draft are reduced proportionately, frequently to much below conventional, giving correspondingly greater strength: e. g. 3×3×3=27 total draft; or 3×4×2=24 total draft; or 3×3×4=36 total draft.

In other words, my invention provides a combed-effect above-conventional break-draft and any desired following draft that will produce the total draft requirement. Where there are two stages of draft after the break-draft, as in a four-roll arrangement, a total draft up to 100 or more is obtainable; for example, with a 3 break-draft and a draft of no more than 6 at either of the two following stages a total draft of 108 results (3×6×6=108), the combined intermediate and final drafts being 36 (6×6). Such combined following draft can be had by any two draft values the multiple of which is 36, as 5 and 7.2, or 4 and 9, 3 and 12, etc. Obviously if the required total draft is less, the drafts at the stages following the break-draft will be less. Thus a break-draft of say 4 and following drafts of 2 and 2, much below conventional, will give a total 16 draft, and incidentally an extremely high quality of product. Or with the same 4 of break-draft following drafts of but 5 and 5 (within the conventional range) give a resultant total draft of 100.

Otherwise stated a characteristic feature of the invention is an above-conventional break-draft with attendant combing action, and as applied to a four-roll arrangement, following intermediate and final drafts at values within or not greatly exceeding the conventional, and preferably not over 6.50. Thus the invention as applied to roll frames having more than three roll pairs comprehends any such apparatus where by means of the described wire or other multi-pointed comber-drafting roll or its equivalent a first or so-called break-draft above 1.125 is had and there is no draft above 6.50 between any subsequent roll pairs. And similarly in a three-roll system it contemplates any such where through the medium of said multi-pointed roll device the break-draft is above the conventional maximum of 1.125 while the following draft, between the middle and the front rolls, however obtained there, either is within the conventional range or is extended to as high as 20 or thereabouts.

Referring again more particularly to the four-roll apparatus and method, in addition to the advantages already mentioned, especially those of maintained or improved quality, the relatively low intermediate and final drafts made available have the further advantage of reducing the weighting required upon the top rolls. In the apparatus of Figs. 1 to 9 for example, its four top rolls require a total weighting of but from 25 to 35 lbs., as against conventional weights of 75 to 100 lbs. The importance of reduced weighting will be appreciated from the consideration that the objectionable static effects with their attendant scattering action upon the fibers, particularly in connection with cotton drafting and spinning, increase directly with the weighting.

As a further feature of the present invention I have herein disclosed certain novel clearer mechanism, noting particularly Figs. 2 and 12 to 16. While in Fig. 2 this clearing means is shown only in association with the lower front and first intermediate rolls 4 and 5, similar means may be provided at any or all of the roll positions.

Referring now to Figs. 2, 12, 13 and 14, said means comprises a strip 80 of wood or other light-weight material extending lengthwise below the under forward portion of the line of rolls 4. Rearwardly of this front strip is a second strip 81, the two being held on a supporting plate 82. The upper face of the front strip 80 is concave to conform generally to the adjacent arc of the roll 4 and has fixed upon it a coextensive piece of selected material 83 adapted to have a wiping action against the roll 4 but with little tendency to collect and hold the lint. Examples of materials which I have found satisfactory for the purpose are a fairly heavy flannel, felt or a medium to heavy grade of duck. The rear strip 81 has at its upper face a multiplicity of upstanding flexible bristles, hairs or the like 84 shown as disposed in the form of tufts arranged in two longitudinal rows and with the tufts of one row offset relative to those of the other. These tufted elements 84 are graduated in height so that their free ends conform generally to the contour of the overlying roll. They have both a wiping and a collecting or removing action and serve in co-operation with the forward fabric-covered wiper element 83 to take care of lint passing the latter.

In association with the first intermediate lower roll 5 the clearer means similarly comprises front and rear strips 85, 86 on a carrier plate 87 and having at their upper faces roll-engaging elements proper 88 and 89 respectively shown as fabric and tufted brush devices similar to those below the front roll 4. The several fabric and brush carrier strips are made of the appropriate height to present their fabric or brush members in the desired operative contact with the corresponding roll.

The clearer means as a whole for the front and the first intermediate rolls 4 and 5 constitutes a unit yieldably presented or floated up against the under surfaces of the rolls. For this purpose the two strip-carrying plates 82 and 87 are connected by a plurality of straps 90, two of which are seen in Fig. 12 and more fully in bottom plan in Fig. 13. These straps are fixed to the underface of one plate 82 or 87, as by means of screws 91, Fig. 13. Adjacent the other plate the straps 90 are formed with longitudinal slots 92 receiving a screw or the like 93 extending through washers 94. This construction allows the clearer elements for the two adjoining rolls to be adjusted as to relative spacing accordingly as the particular spacing of their rolls may require.

At a substantially central point between the front and rear plates 82, 87 the straps 90 are apertured as at 95 to receive one end of a cord, thong or the like 96 anchored to the straps as by knotting or by tieing to a pin or the like below the straps, as at 97. The cords 96 extend upwardly over and down from one of the two adjacent lower rolls, herein the front roll 4, at the boss between the adjacent fluted portions of such roll, and have each a weight 98 attached at their depending ends. Any number of such supporting weights may be employed according to the length of the clearer elements as in turn determined by the number of drafting stations along the roll shafts, their weight being selected to maintain the clearer unit as a whole upwardly against the overlying rolls with the desired tension and pressure to afford an efficient clearing action.

The described clearer unit may further comprise lint collecting means adjacent either or both rolls. Such means is shown in Figs. 2 and 12 to 14 in association with the rear pair of clearer elements, that is, those for the first intermediate roll 5, being disposed closely behind the front element of said pair, the fabric wiper 88, between it and the tufted brush element 89. It is composed of an upright strip 99 coextensive with the carrier strip 86 and disposed at the forward face of the latter, and having a height to extend substantially from the plate 87 up to a level adjacent the roll 5. The front face of this strip 99 has a formation adapted to catch and retain fibrous matter such as lint on coming into contact with it. One medium which I have found admirably suited for the purpose is a strip of unfinished sheepskin or pelt disposed with the wool side 99a forwardly, as best seen in Figs. 2 and 14. The projecting upper portion of such strip may be stiffened or reinforced, the strip being tacked, cemented or otherwise secured at its lower portion to one of the clearer strips, to the strip 86 in the example shown.

Fig. 15 represents a modified clearer construction in which each of the four carrier strips 80a, 81a, 85a, 86a, each concave at its upper face, is equipped with the fabric form of contacting and wiping means 83a, 83a', 88a, 88a' respectively. These may be of flannel, felt, duct or other non-collecting fabric similarly as the fabric pieces 83 and 88 of the preceding figures.

Fig. 16 shows a further modification wherein one of the clearer strip pairs, herein the front pair 80b, 81b carries only the fabric type of wiper means 83b, 83b' while the strips 85b, 86b each support rows of tufted or other bristles 84b, 84b' generally similar to the elements 84 and 89 of Figs. 12 to 14 and have the appropriate height for engagement with the overlying rear roll of a pair. In still other instances the arrangement as between fabric and brush elements may be the reverse of that illustrated in Fig. 16, that is, so as to present the brush elements in the front position and the fabric wiper means behind them.

It will be understood that my invention, either as to product, means or method, is not limited to the exemplary embodiments or steps herein illustrated or described, and I set forth its scope in my following claims.

I claim:

1. That method of preparing solely by rotary roll means fibrous material for subsequent spinning purposes which comprises conditioning and drafting the material in a single roll-frame and which further comprises break-drafting the material with a rotary combing and fiber-controlling action and to an amount above the conventional non-combing solely roll-effected brake-draft of 1 to 2.25 and not greater than about 6.5, and subsequently further drafting the material at two or more inter-roll stations at each of which the draft is within 6.5 and so calculated with reference to said increased and combing-action break-draft as to afford the desired total draft, free of impairment of quality of the product, between the minimum requirement and an available maximum exceeding 100.

2. Roll drafting pre-spinning apparatus for textile fibers comprising in combination, a frame, a plurality of paired upper and lower rolls rotatably mounted on the frame, said roll pairs including front, first intermediate, second intermediate, and rear rolls in order from front to rear, the upper roll of said rear pair having a fiber-engaging circumference presented by a multiplicity of substantially radially disposed pointed elements, the lower front roll shaft being driven, and drive connection between said driven shaft and the other lower roll shafts, said connection comprising a crown gear drive from said front shaft, gearing means including a change-gear and intermediate gears drivingly connecting the crown gear and the first intermediate roll shaft, other gearing means including a second change-gear operatively connecting one of said intermediate gears and second intermediate roll shaft, and further gearing including a third change-gear drivingly connecting the last-named shaft and that of the lower rear roll, said entire gearing means being constructed and arranged as a compact unitary assembly at one end of the frame, the rear roll pair and the gearing drivingly connecting the lower roll thereof with the shaft of the second intermediate roll being all readily demountably disposed on the frame whereby the latter is available also as a three-roll apparatus subject to close spacing of the rolls.

3. Roll drafting pre-spinning apparatus according to claim 2 wherein the gearing elements including the several change-gears are in such ratio and arrangement as to afford selectively at the rear or break-draft position drafts averaging between greater than 2 and 6.5 and to afford initial or break-draft, intermediate and final drafts predeterminedly variable within the range of 2 to about 6.50.

4. In a pre-spinning textile fiber drafting system, in combination, a roll-frame, roll stands thereon having bearing provisions for rotatively mounting front, first intermediate, second intermediate and back pairs of top and bottom rolls in position successively to receive and advance the fibrous material between the rolls of each pair in order from back to front, the back roll pair including a top roll having a fiber-engaging circumferential portion composed of a multiplicity of radial points, drive connections for the shafts of each of the lower rolls, and positive gearing connections between the bottom roll and the multi-pointed top roll of the back pair, said connections comprising intermeshing toothed gears disposed in vertical alignment upon the respective shafts of said back roll pair and differing as to the number of teeth.

5. In a pre-spinning roll-frame for textile drafting purposes, in combination with front and intermediate roll pairs, a back roll pair comprising a cylindrical lower roll and a superposed upper roll having a fiber-engaging circumferential portion consisting of a multiplicity of radial points, a toothed gear on the shaft of said lower roll, and a gear on the shaft of said multi-pointed upper roll in position to mesh with said gear on the lower roll shaft, said gears differing as to number of teeth, and whereby the upper roll is positively driven in predetermined speed ratio with respect to the lower roll.

6. In a pre-spinning roll-frame for textile drafting purposes, in combination with front and intermediate roll pairs, a back roll pair comprising a cylindrical lower roll and a superposed upper roll having a fiber-engaging circumferential portion consisting of a multiplicity of radial points, a toothed gear on the shaft of said lower roll, and a gear on the shaft of said multi-pointed upper roll in position to mesh with said gear on the lower roll shaft and whereby the upper roll is positively driven in predetermined speed ratio with respect to the lower roll, the top roll gear having a greater number of teeth than that of the lower roll, thereby to augment the combing and drafting action thereat.

7. In a pre-spinning roll-frame for textile drafting purposes, in combination with front and intermediate roll pairs, a back roll pair comprising a cylindrical lower roll and a superposed upper roll having a fiber-engaging circumferential portion consisting of a multiplicity of radial points, a toothed gear on the shaft of said lower roll, and a gear on the shaft of said multi-pointed upper roll in position to mesh with said gear on the lower roll shaft and whereby the upper roll is positively driven in predetermined speed ratio with respect to the lower roll, the upper roll being driven at a slower rate than the lower roll, thereby to augment the combing and drafting action thereat.

ELWIN H. ROONEY.